A. S. WEAVER. 2 Sheets—Sheet 1.
TWO SIDE SEATED BICYCLE.
No. 11,561. Reissued Aug. 4, 1896.
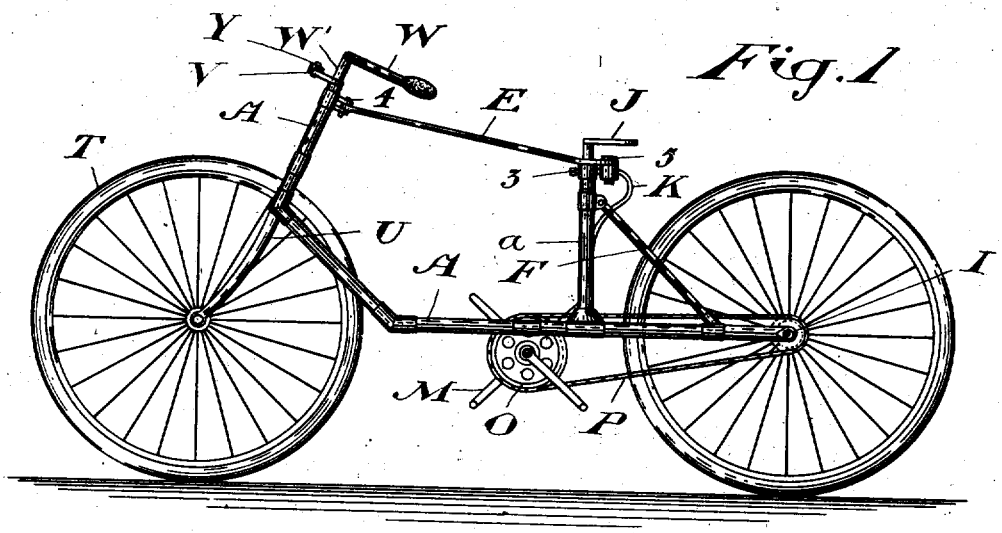
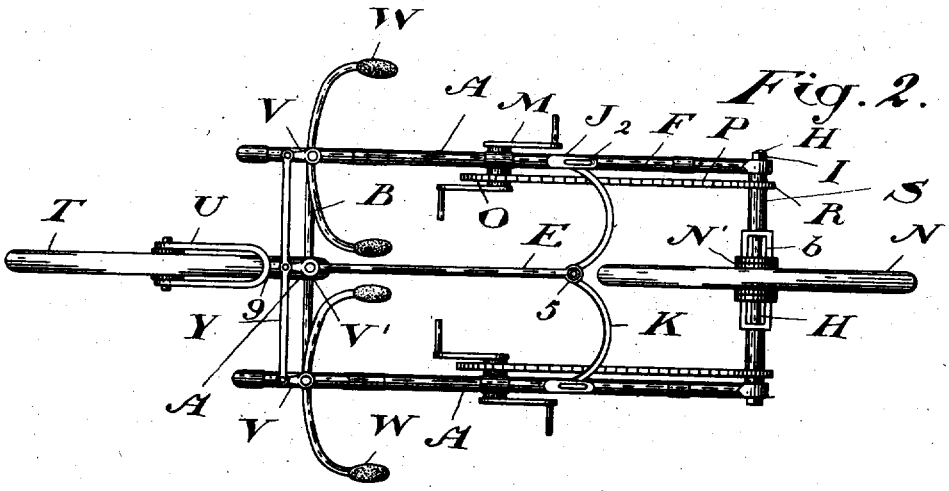
Witnesses
Fred. Clarke
F. M. Neff
Inventor
Albert S. Weaver
by
Ridout & Maybee
Attys.

A. S. WEAVER. 2 Sheets—Sheet 2.

TWO SIDE SEATED BICYCLE.

No. 11,561. Reissued Aug. 4, 1896.

Witnesses

Fred. Clarke

A. M. Neff

Inventor

Albert S. Weaver by

Ridout & Maybee

Attys

UNITED STATES PATENT OFFICE.

ALBERT SHELDON WEAVER, OF HAMILTON, CANADA, ASSIGNOR, BY DIRECT AND MESNE ASSIGNMENTS, TO HIMSELF AND WILLIAM JEFFERSON GOOLD, OF SAME PLACE.

TWO-SIDE-SEATED BICYCLE.

SPECIFICATION forming part of Reissued Letters Patent No. 11,561, dated August 4, 1896.

Original No. 543,070, dated July 23, 1895. Application for reissue filed February 25, 1896. Serial No. 580,764.

*To all whom it may concern:*

Be it known that I, ALBERT SHELDON WEAVER, of the city of Hamilton, in the county of Wentworth and Province of Ontario, Canada, have invented a new and useful Two-Side-Seated Bicycle, of which the following is a specification.

My improvements relate to an adjustable two-side-seated bicycle; and it consists of a frame having two sides, each side provided with an adjustable seat supported by vertical standards which form a part of said frame, and two ground-wheels in tandem form in front and rear of said seats; also opposite each seat are a pair of handles connected to mechanism for guiding the front wheel, each pair of handles being capable of guiding the bicycle independently.

The objects of my improvements are, first, to provide a bicycle which is capable of seating, side by side, two persons; second, to afford facilities for the proper adjustment of the seats to suit a heavy and light person and the guiding of the machine, and, third, to provide means of applying one of the adjustable side seats to a middle position located on a line with two ground-wheels when the side seats are not used. I attain these objects by the mechanism illustrated in the accompanying drawings, in which—

Figure 3:
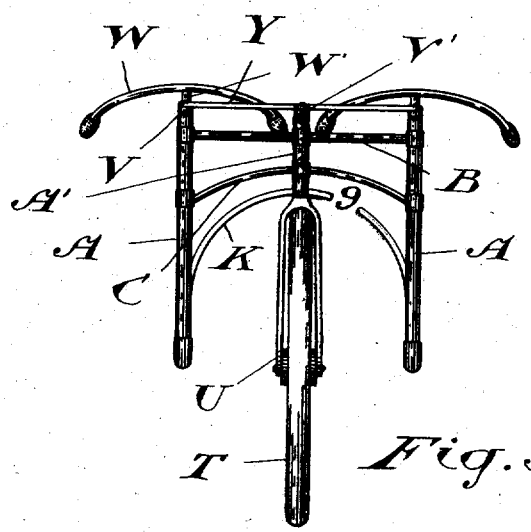
Figure 4:
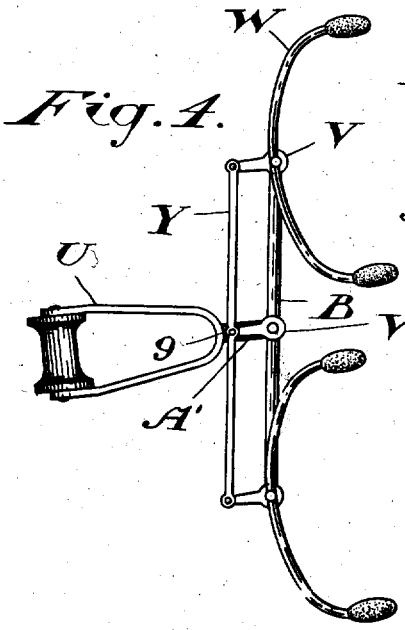
Figure 5:
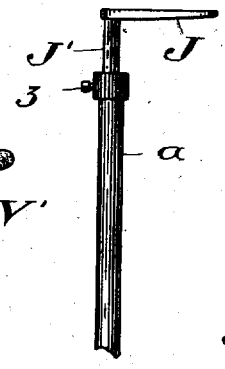
Figure 6:
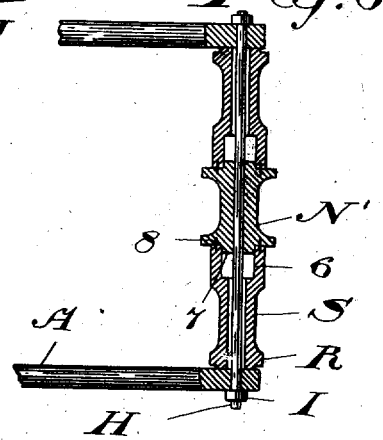

Figure 1 is a side elevation. Fig. 2 is a plan of a bicycle, these two views embodying my invention. Fig. 3 is a front elevation of the same, the seats, rear wheel, and driving mechanism being left out. Fig. 4 is an enlarged plan of the front fork with hub of wheel and guiding mechanism. Fig. 5 is an enlarged elevation of broken standard, with adjustable support for seat in position; and Fig. 6 is an enlarged plan of rear of frame broken, showing section of revolving belt or chain wheels with axles and central hub of rear ground-wheel on their stationary through-spindle.

Similar letters and numerals refer to similar parts throughout the several views.

The two sides of the frame of the bicycle, tubular in section, are indicated by A, and are held in relative position by means of the front cross-braces B and C, with central front part A′ of frame, the seat-braces E and F, and the rear rigid axle H, provided with nuts I to secure said axle to frame. The two vertical tube-standards A, to which the upper end of said braces F are connected, also form a part of the frame. The seat-supports J have slotted holes 2 for the purpose of attaching and adjusting thereto a seat or saddle and are provided with under shanks J′, which fit into the said tube-standards and are capable of vertical and horizontal adjustment and held in desired position by means of set-screws 3. This horizontal adjustment of said seat-supports tends to evenly balance the machine sidewise when one person is of greater weight or longer proportion than his or her partner.

A cross-brace K, having two rearward curves to allow perfect freedom to the inner limbs of the side cyclists, is a part of or attached to the middle or lower part of the standards, and has a hub similar to the upper ends of said standards to allow one of the said seat-supports J to be inserted therein, for the purpose of seating one person in the middle of the machine.

It will be perceived that the brace E, the forward end of which is attached to the middle of the front part of frame by means of lugs 4 and pin and the rear end to the top of central hub of said seat-brace K by detachable pin 5, can, by removing this pin and at the same time one of the supports J, be attached to the upper end of either one of the two standards and held in position by inserting said pin 5 or a support J, or in lieu of said pin three seat-supports may be supplied. The three preparations alluded to for seat-supports are on the same circular line from radial center of lugs 4, in which said brace E is allowed to swivel.

It will be noticeable that the foot pedals or cranks M are placed in position to allow the inner limbs of the cyclists to operate together, though one of the two may be changed to an angle when the machine is operated from the central seat. These cranks drive the rear ground-wheel N in the ordinary manner of bicycles by means of the belt or chain wheels O, the belts P, and the belt-wheels R. These belt-wheels R form a part of the extension-hubs S, which revolve on the said through-axle H. Each said extension-hub has an opening 6 to allow for the adjustment of ball-bearings, if used and if necessary. The central hub N′ of rear wheel N has a slight round projection 7 at each end which fits into the inner ends of said extension-hubs and also is provided with two or more pins 8, which enter the inner ends of extension-hubs and the outer ends of hub N of wheel, these pins being capable of driving said wheel N.

The front ground-wheel T is connected to the machine by means of the bent fork U in the usual manner. The hollow tube-shank or upper part of this fork is round and hidden from view, commencing from the line 9 immediately above the fork proper, as seen in Fig. 3 of the drawings. This line 9 denotes the lower end of the central front part A′ of the frame A and the commencement of said shank. The upper end of this shank is secured to the inner end of the central lever V′ of the two levers V, and the inner end of each of the side levers V is secured to each of the shanks W′ of the guiding-handles W, said shanks fitting into the side tubes of upper part of front of frame. These two side levers, when operated by one or both the said pair of handles W, operate the central lever V′ by means of cross-rod Y, which is connected to the outer ends of the three said levers. Either pair of handles will suffice to guide the machine, as both pairs are connected to the said cross-rod.

The handles could be so arranged as to be interchangeable—that is, to allow either pair to be applied to the hollow or tube shank of the fork. This would be in case one person was on the devised central seat on the brace K. This interchanging could be accomplished by simply inserting the shank W′ of either of the two handles into the tube or round aperture of shank of fork and fastened to same by means of set-screw or other convenient manner.

In case a lady should occupy the central seat the brace E may be removed.

It will be obvious that by the fact of the interchanging of the seats, as previously mentioned, and also by the fact of the guiding mechanism being applicable to either one of the three seats a cyclist may take a partner to a distant city and return alone on the bicycle, this being a very important element in my invention.

What I claim as my invention is—

1. In a bicycle, the combination of side frames held suitably apart by means of cross-braces and the axle for the rear wheel, the wheels being journaled thereon centrally between said side frames; a hub for the rear wheel sleeved on the axle and extending outwardly from the wheel between said side frames; separate driving mechanism connected with the outer ends of said extended hub and driven independently from each of said side frames, and steering-gear for the front wheel, substantially as described and specified.

2. In a bicycle the combination of side frames of any construction held suitably apart by means of cross-braces and the axle for the rear wheel; a rear wheel located between said frames; a hub on said rear wheel sleeved on said axle and extending outwardly from said wheel into proximity with the said side frames; seats located on standards from each of said side frames; crank-arms provided with pedals and connected with axles suitably journaled on the crank-hangers of each of said side frames; pedal sprocket-wheels on the axles of the crank-arms adapted to drive rear sprocket-wheels fixed to each of the outer ends of the extended hub of the rear wheel and immediately behind the pedal sprocket-wheels; and a front wheel suitably journaled midway on the front cross-braces between the side frames and steering-gear for the said front wheel, substantially as described and specified.

3. In a bicycle, the combination of side frames of any construction held suitably apart by means of cross-braces and the axle for the rear wheel; a rear wheel located between said frames; a hub on said rear wheel sleeved on said axle and extending outwardly from said wheel into proximity with the said side frames; seats located on standards from each of said side frames; crank-arms, provided with pedals and connected with axles suitably journaled on the crank-hangers of each of said side frames; pedal sprocket-wheels on the axles of the crank-arms adapted to drive rear sprocket-wheels fixed to each of the outer ends of the extended hub of the rear wheel and immediately behind the pedal sprocket-wheels, and a front wheel journaled on its fork, the fork-stem being held by a head located on the front braces midway between the side frames; a lever fixed to the fork-stem and pivotally connected with a cross-rod; levers fixed to the shanks of the handles journaled on the side frames and also pivotally connected with the cross-rod, substantially as described and specified.

4. The combination of the two-sided tubular frame A, with the central front tubular part A′, to receive shank of fork U, and connected together by means of the cross-braces B and C, each side of said frame having a vertical tubular standard *a*, which are capable of supporting the seat-supports J, provided with slots 2, by means of their shanks J′, and held in position by means of set-screws 3, the curved cross-brace K connected to said standards, and having a central hub of same height adapted to receive the shank J′, of seat-support J, the brace E, its forward end pivoted to lugs 4, its radial center and its rear end capable of attachment to either of the upper ends of said standards or the said hub of cross-brace K, by means of the insertion of one said shank J′ or of pin 5, the brace F, the crank-pedals M, and the ground-wheels, substantially as described.

5. The combination of the two-sided frame A, with the central front part A′, of tubular construction to admit the shank of fork U, in connection with ground-wheel T, and connected together by cross-braces B and C, said frame having tubular standards *a*, capable of receiving and allowing of adjustment the shanks of seat-supports J, the rearward-curved brace K, connected to said standards and having a central hub of same height capable of receiving a shank of seat-support J, the brace E, pivoted to lugs 4, and to either one of said standards, or to the hub of brace K, by means of pin 5, or said shank J′, the pedals M, the through rigid axle H, provided with ground-wheel N, having central hub N′ and extension-hubs S, having openings 6, and sprocket-wheels R, as a part thereof, the sprocket-wheels O, and chains P, the two pairs of detachable handles W, having shanks W′ capable of insertion in upper tubular front of both sides of frame and also in the tubular shank of fork U, the two side levers V, secured to shanks of said handles the lever V′, the forward ends of said levers secured to the cross-rod Y, and the ground-wheel T, journaled to the said fork U, substantially as described.

Hamilton, February 17, 1896.

ALBERT SHELDON WEAVER.

In presence of—

A. M. NEFF,

FREDK. CLARKE.